(12) United States Patent
Tanaka

(10) Patent No.: US 9,470,703 B2
(45) Date of Patent: Oct. 18, 2016

(54) PHYSICAL QUANTITY SENSOR AND ELECTRONIC APPARATUS

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 473 days.

(21) Appl. No.: 13/856,053

(22) Filed: Apr. 3, 2013

(65) Prior Publication Data

US 2013/0263662 A1 Oct. 10, 2013

(30) Foreign Application Priority Data

Apr. 6, 2012 (JP) ................................. 2012-087244

(51) Int. Cl.
| | |
|---|---|
| *G01P 15/125* | (2006.01) |
| *G01P 1/00* | (2006.01) |
| *G01P 15/08* | (2006.01) |

(52) U.S. Cl.
CPC ............ *G01P 1/003* (2013.01); *G01P 15/0802* (2013.01); *G01P 15/125* (2013.01); *G01P 2015/0882* (2013.01)

(58) Field of Classification Search
CPC ...................... G01P 15/125; G01P 2015/0882
USPC .......................................... 73/514.13, 514.32
See application file for complete search history.

(56) References Cited

U.S. PATENT DOCUMENTS

| | | | |
|---|---|---|---|
| 5,404,749 A | 4/1995 | Spangler | |
| 5,488,864 A | 2/1996 | Stephan | |
| 5,905,203 A | 5/1999 | Flach et al. | |
| 6,513,380 B2 | 2/2003 | Reeds, III et al. | |
| 7,121,141 B2 | 10/2006 | McNeil | |
| 8,079,262 B2 | 12/2011 | Guo | |
| 2010/0024553 A1* | 2/2010 | Classen | ................. G01P 15/125 73/514.32 |
| 2012/0031185 A1* | 2/2012 | Classen et al. | ............ 73/514.14 |

FOREIGN PATENT DOCUMENTS

| | | |
|---|---|---|
| JP | 06-308152 | 11/1994 |
| JP | 09-189716 | 7/1997 |
| JP | 2009-109494 | 5/2009 |
| JP | 2009-537803 | 10/2009 |
| WO | 2007-131835 | 11/2007 |

* cited by examiner

*Primary Examiner* — John Chapman, Jr.
(74) *Attorney, Agent, or Firm* — Harness, Dickey & Pierce, P.L.C.

(57) ABSTRACT

A physical quantity sensor includes: a substrate; a movable body including, with a first axis as a boundary, a first movable electrode portion disposed in a first region, a second movable electrode portion disposed in a second region, and a damping adjusting portion disposed in at least one of the first region and the second region; beam portions supporting the movable body; a first fixed electrode portion; and a second fixed electrode portion. A first through-hole is disposed in the damping adjusting portion. Second through-holes are disposed in the movable electrode portions. The area of a region where the first movable electrode portion overlaps with the first fixed electrode portion is the same as the area of a region where the second movable electrode portion overlaps with the second fixed electrode portion. The width of the first through-hole is greater than the widths of the second through-holes.

4 Claims, 6 Drawing Sheets

PHYSICAL QUANTITY SENSOR AND ELECTRONIC APPARATUS

BACKGROUND

1. Technical Field

The present invention relates to a physical quantity sensor and an electronic apparatus.

2. Related Art

In recent years, techniques for realizing a physical quantity sensor that is small and has high sensitivity have been developed using, for example, a silicon MEMS (Micro Electro Mechanical Systems) technique.

For example, JP-T-2009-537803 (Patent Document 1) discloses an acceleration sensor with a mass having two wings rotatable about a torsion web. The acceleration sensor is configured such that through-holes are disposed in each of the two wings and thus torsions of the same magnitude in opposite directions relative to the torsion web cause damping torques of the same magnitude. Moreover, the acceleration sensor has a first electrode below one of the wings and a second electrode below the other wing. The acceleration sensor detects acceleration based on an electrostatic capacitance between the one wing and the first electrode and an electrostatic capacitance between the other wing and the second electrode.

In the acceleration sensor of Patent Document 1, the mass is accommodated in a casing filled with a gas such as nitrogen. By disposing the through-holes in the wing, damping (action to stop the movement of the mass, or flow resistance) caused by the viscosity of the gas can be reduced. With this configuration, the detection sensitivity can be enhanced.

However, in the acceleration sensor of Patent Document 1, since the size of the through-hole is different between the two wings, the area of a region where the one wing overlaps with the first electrode in plan view is different from the area of a region where the other wing overlaps with the second electrode in plan view. Therefore, in an initial state (state where acceleration is not applied, or state where the wings are horizontal), the electrostatic capacitance between the one wing and the first electrode is different from the electrostatic capacitance between the other wing and the second electrode. Hence, for eliminating the difference between the initial capacitances, an adjustment of a gap between the wing and the electrode, or a circuit or the like for correcting the difference between the initial capacitances is required. Therefore, the configuration of an apparatus cannot be simplified, leading to problems such as increases in manufacturing processes and cost.

SUMMARY

An advantage of some aspects of the invention is to provide a physical quantity sensor that has a simple configuration and can enhance detection sensitivity. Another advantage of some aspects of the invention is to provide an electronic apparatus having the physical quantity sensor.

The invention can be implemented as the following modes or application examples.

Application Example 1

A physical quantity sensor according to this application example includes: a movable body displaceable about a first axis as an axis of rotation and including, with the first axis as a boundary in plan view, a first movable electrode portion disposed in a first region, a second movable electrode portion disposed in a second region, and a damping adjusting portion disposed in at least one of the first region and the second region; a beam portion supporting the movable body; a first fixed electrode portion arranged to face the first movable electrode portion; and a second fixed electrode portion arranged to face the second movable electrode portion, wherein a first through-hole is disposed in the damping adjusting portion, a second through-hole is disposed in the first movable electrode portion and the second movable electrode portion, in a portion excepting the second through-holes in plan view, the area of a region where the first movable electrode portion overlaps with the first fixed electrode portion is the same as the area of a region where the second movable electrode portion overlaps with the second fixed electrode portion, and the width of the first through-hole is greater than the width of the second through-hole.

According to the physical quantity sensor, in the portion excepting the second through-holes in plan view, the area of the region where the first movable electrode portion overlaps with the first fixed electrode portion is the same as the area of the region where the second movable electrode portion overlaps with the second fixed electrode portion. Therefore, in an initial state (for example, a state where the movable body is horizontal), an electrostatic capacitance between the first movable electrode portion and the first fixed electrode portion can be made equal to an electrostatic capacitance between the second movable electrode portion and the second fixed electrode portion with a simple configuration. Further, the width of the through-hole disposed in the damping adjusting portion is greater than the width of the through-hole disposed in the first movable electrode portion and the second movable electrode portion. Therefore, damping (action to stop the movement of the movable body, or flow resistance) can be efficiently reduced while securing the area of the first movable electrode portion and the area of the second movable electrode portion. Hence, according to the physical quantity sensor, a simple configuration is provided, and the detection sensitivity can be enhanced.

Application Example 2

In the physical quantity sensor according to the application example, the mass of the first region of the movable body and the mass of the second region of the movable body may be different from each other.

According to the physical quantity sensor of this configuration, when acceleration in the vertical direction is applied for example, a rotation moment of the first region of the movable body and a rotation moment of the second region of the movable body are not balanced, so that a predetermined inclination can be produced in the movable body.

Application Example 3

In the physical quantity sensor according to the application example, the total area of an opening surface of the second through-hole disposed in the first movable electrode portion, the opening surface being on the first fixed electrode portion side, may be the same as the total area of an opening surface of the second through-hole disposed in the second movable electrode portion, the opening surface being on the second fixed electrode portion side.

According to the physical quantity sensor of this configuration, a simple configuration is provided, and since an initial capacitance between the first movable electrode portion and the first fixed electrode portion can be made equal to an initial capacitance between the second movable electrode portion and the second fixed electrode portion, the accuracy of detection sensitivity can be further enhanced.

Application Example 4

In the physical quantity sensor according to the application example, the second through-hole may extend in a direction of the first axis.

According to the physical quantity sensor of this configuration, damping can be efficiently reduced while securing the area of the first movable electrode portion and the area of the second movable electrode portion.

Application Example 5

In the physical quantity sensor according to the application example, a plurality of at least one of the first through-holes and the second through-holes may be disposed.

According to the physical quantity sensor of this configuration, damping can be more reduced.

Application Example 6

In the physical quantity sensor according to the application example, the damping adjusting portion may be disposed at an edge portion of the movable body in a direction of a second axis crossing the first axis.

According to the physical quantity sensor of this configuration, since the first through-hole can be disposed at a point away from the first axis serving as the axis of rotation, damping can be efficiently reduced.

Application Example 7

In the physical quantity sensor according to the application example, the damping adjusting portion may be disposed in both of the first region and the second region, and the width of the first through-hole of the damping adjusting portion disposed in the first region may be greater than the width of the first through-hole of the damping adjusting portion disposed in the second region.

According to the physical quantity sensor of this configuration, a simple configuration is provided, and the detection sensitivity can be enhanced.

Application Example 8

An electronic apparatus according to this application example includes the physical quantity sensor according to the application example.

According to the electronic apparatus, since the physical quantity sensor according to the application example is included, a simple configuration is provided, and the detection sensitivity can be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail using the drawings. The embodiment described below does not unduly limit the contents of the invention set forth in the appended claims. Moreover, not all of configurations described below are indispensable constituent features of the invention.

1. Physical Quantity Sensor

Figure 1:
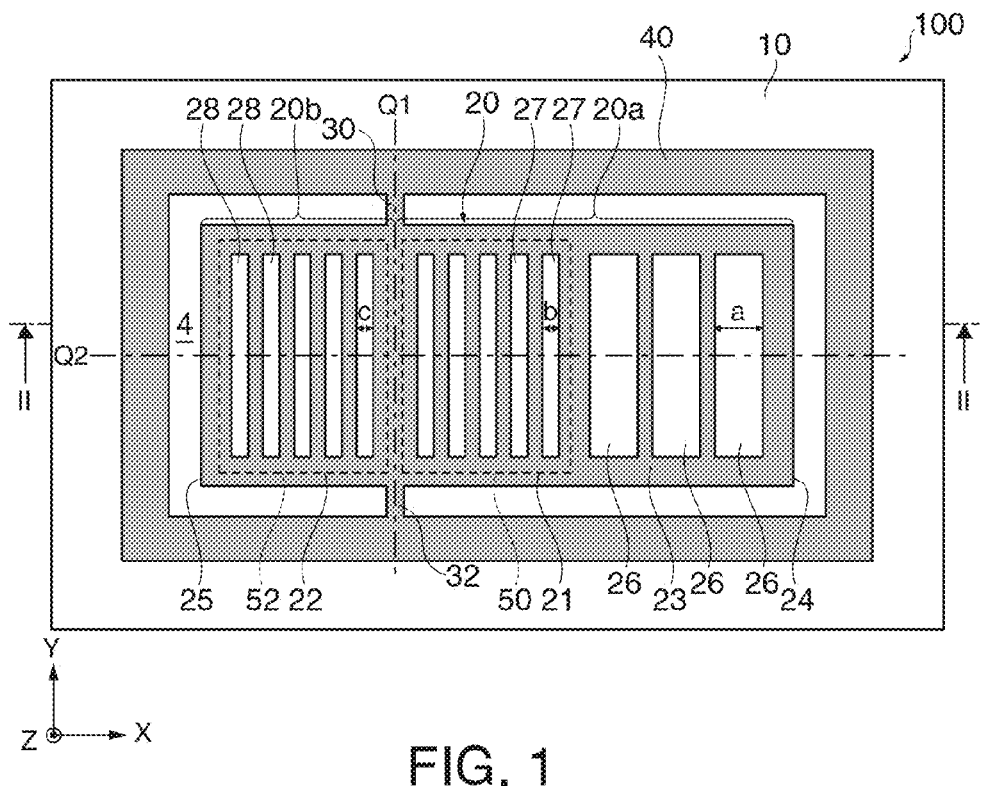
FIG. 1 is a plan view schematically showing a physical quantity sensor according to an embodiment.
Figure 2:
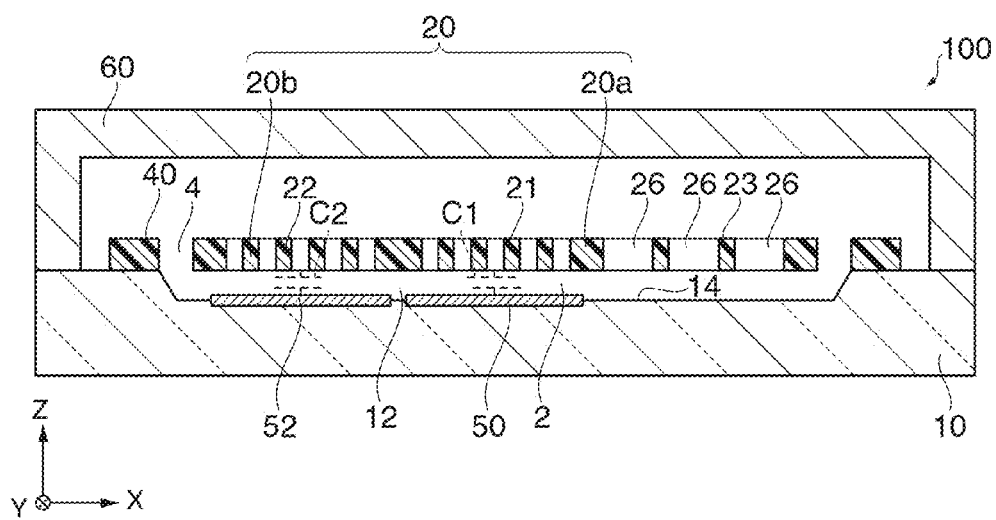
FIG. 2 is a cross-sectional view schematically showing the physical quantity sensor according to the embodiment.

First, a physical quantity sensor according to an embodiment will be described with reference to the drawings. FIG. 1 is a plan view schematically showing the physical quantity sensor 100 according to the embodiment. FIG. 2 is a cross-sectional view schematically showing the physical quantity sensor 100 according to the embodiment. FIG. 2 is the cross-sectional view taken along line II-II of FIG. 1. Moreover, for convenience sake, the illustration of a lid 60 is omitted in FIG. 1. In FIGS. 1 and 2, the X-axis, the Y-axis, and the Z-axis are illustrated as three axes perpendicular to each other.

The physical quantity sensor 100 can be used as, for example, an inertial sensor. Specifically, the physical quantity sensor 100 can be used as, for example, an acceleration sensor (electrostatic capacitive acceleration sensor or electrostatic capacitive MEMS acceleration sensor) for measuring acceleration in the vertical direction (Z-axis direction).

As shown in FIGS. 1 and 2, the physical quantity sensor 100 includes a support substrate (substrate) 10, a movable body 20, beam portions 30 and 32, a first fixed electrode portion 50, and a second fixed electrode portion 52. The physical quantity sensor 100 can further include a fixed portion 40 and the lid 60.

The first fixed electrode portion 50 and the second fixed electrode portion 52 are disposed on the support substrate 10. In the illustrated example, the fixed electrode portions 50 and 52 are disposed on a surface 14 of the support substrate 10, where the surface 14 defines a bottom surface of a recess 12. The surface 14 of the support substrate 10 on which the fixed electrode portions 50 and 52 are disposed is a flat surface. The surface 14 of the support substrate 10 is parallel to the movable body 20 when the movable body 20 is horizontal (parallel to the XY-plane). The fixed portion 40 and the lid 60 are bonded to the support substrate 10. The support substrate 10 and the lid 60 can form a space for accommodating the movable body 20. In the space, an inert gas such as nitrogen, helium, or argon, for example, is filled. The material of the support substrate 10 is not particularly limited, but is, for example, an insulating material such as glass. For example, the support substrate 10 is formed of an insulating material such as glass and the movable body 20 is formed of a semiconductor material such as silicon, so that the movable body 20 and the support substrate 10 can be easily insulated from each other by bonding them together, and thus the sensor structure can be simplified.

The movable body 20 is disposed above the support substrate 10 with a gap 2. The movable body 20 is supported by the first beam portion 30 and the second beam portion 32. The movable body 20 is displaceable about a first axis Q1 as an axis of rotation. Specifically, when acceleration in the vertical direction (Z-axis direction) is applied for example, the movable body 20 can rock in a seesaw manner about the first axis Q1, which is determined by the beam portions 30 and 32, as the axis of rotation (rocking axis). The shape of the outer circumferential edge of the movable body 20 is, for example, a rectangle in plan view (as viewed from the Z-axis direction). Moreover, the thickness (size in the Z-axis direction) of the movable body 20 is, for example, constant.

The movable body 20 has a first seesaw piece 20a and a second seesaw piece 20b. The first seesaw piece 20a is a first region (portion located on the right of FIG. 1) that is one of two regions of the movable body 20, where the two regions are defined by the first axis Q1 in plan view. The second seesaw piece 20b is a second region (portion located on the left of FIG. 1) that is the other of the two regions of the movable body 20, where the two regions are defined by the first axis Q1 in plan view.

For example, when acceleration (for example, gravitational acceleration) in the vertical direction is applied to the movable body 20, a rotation moment (moment of force) is generated in each of the first seesaw piece 20a and the second seesaw piece 20b. Here, when the rotation moment (for example, a clockwise rotation moment) of the first seesaw piece 20a and the rotation moment (for example, a counterclockwise rotation moment) of the second seesaw piece 20b are balanced, the inclination of the movable body 20 is not changed and thus a change in acceleration cannot be detected. Hence, the movable body 20 is designed such that when acceleration in the vertical direction is applied, the rotation moment of the first seesaw piece 20a and the rotation moment of the second seesaw piece 20b are not balanced and thus a predetermined inclination is produced in the movable body 20.

In the physical quantity sensor 100, the first axis Q1 is arranged at a position shifted from the center (center of gravity) of the movable body 20 (distances from the first axis Q1 to respective tips of the seesaw pieces 20a and 20b are differentiated from each other), so that the seesaw pieces 20a and 20b have masses different from each other. That is, the mass of the movable body 20 is different between one side thereof (the first seesaw piece 20a) and the other side thereof (the second seesaw piece 20b) with the first axis Q1 as the boundary. In the illustrated example, a distance from the first axis Q1 to an edge surface 24 of the first seesaw piece 20a is greater than a distance from the first axis Q1 to an edge surface 25 of the second seesaw piece 20b. Moreover, the thickness of the first seesaw piece 20a is equal to the thickness of the second seesaw piece 20b. Hence, the mass of the first seesaw piece 20a is greater than the mass of the second seesaw piece 20b. Since the seesaw pieces 20a and 20b have masses different from each other as described above, when acceleration in the vertical direction is applied, the rotation moment of the first seesaw piece 20a and the rotation moment of the second seesaw piece 20b can be prevented from being balanced. Hence, when acceleration in the vertical direction is applied, a predetermined inclination can be produced in the movable body 20.

Although not illustrated, the seesaw pieces 20a and 20b may have masses different from each other by arranging the first axis Q1 at the center of the movable body 20 and differentiating the thicknesses of the seesaw pieces 20a and 20b from each other. Also in this case, when acceleration in the vertical direction is applied, a predetermined inclination can be produced in the movable body 20.

The movable body 20 is disposed spaced apart from the support substrate 10. In the illustrated example, the gap 2 is disposed between the movable body 20 and the support substrate 10. Moreover, the movable body 20 is connected to the fixed portion 40 via the beam portions 30 and 32 while being spaced apart from the fixed portion 40. A gap 4 is disposed between the movable body 20 and the fixed portion 40. The gaps 2 and 4 are present around the movable body 20, so that the movable body 20 can rock in a seesaw manner.

The movable body 20 has, in the first seesaw piece 20a on one side of the first axis Q1 in plan view, a first movable electrode portion 21 and a damping adjusting portion 23. Further, the movable body 20 has, in the second seesaw piece 20b on the other side of the first axis Q1 in plan view, a second movable electrode portion 22.

The first movable electrode portion 21 is a portion of the movable body 20, where the portion overlaps with the first fixed electrode portion 50 in plan view. The first movable electrode portion 21 is a portion of the movable body 20, where the portion forms an electrostatic capacitance C1 with the first fixed electrode portion 50. In the first movable electrode portion 21, through-holes (second through-holes) 27 penetrating through the movable body 20 in its thickness direction (Z-axis direction) are disposed. In the illustrated example, the plurality of (five) through-holes 27 are disposed in the first movable electrode portion 21.

The second movable electrode portion 22 is a portion of the movable body 20, where the portion overlaps with the second fixed electrode portion 52 in plan view. The second movable electrode portion 22 is a portion of the movable body 20, where the portion forms an electrostatic capacitance C2 with the second fixed electrode portion 52. In the second movable electrode portion 22, through-holes (second through-holes) 28 penetrating through the movable body 20 in its thickness direction are disposed. In the second movable electrode portion 22, the plurality of (five) through-holes 28 are disposed. In the physical quantity sensor 100, the movable body 20 may be composed of an electrically-conductive material to thereby form the movable electrode portions 21 and 22. Moreover, a movable electrode portion formed of a conductor layer such as of a metal can be formed on the surface of the movable body 20. In the illustrated example, the movable body 20 is composed of an electrically-conductive material (silicon doped with an impurity) to thereby form the movable electrode portions 21 and 22.

The damping adjusting portion 23 is a portion of the movable body 20, where the portion does not overlap with the fixed electrode portions 50 and 52 in plan view. In the illustrated example, the damping adjusting portion 23 is disposed at an edge portion of the movable body 20 in a direction of a second axis Q2 (direction along the second axis Q2). Here, the second axis Q2 is an axis perpendicular to the first axis Q1. In the first seesaw piece 20a, the first movable electrode portion 21 and the damping adjusting portion 23 are arranged side by side in this order from the first axis Q1 side in the direction of the second axis Q2 (positive X-axis direction in the illustrated example). In the damping adjusting portion 23, through-holes (first through-holes) 26 penetrating through the movable body 20 in its thickness direction are disposed. In the illustrated example, the plurality of (three) through-holes 26 are disposed in the damping adjusting portion 23. The numbers of the through-holes 26, 27, and 28 are not particularly limited. By adjusting the number or area of the through-holes 26 in the damping adjusting portion 23, the damping of the movable body 20 can be adjusted.

The through-holes 26, 27, and 28 serve as gas flow paths in rocking (rotation) of the movable body 20. Therefore, damping (action to stop the movement of the movable body, or flow resistance) caused by the viscosity of gas in rocking of the movable body 20 can be reduced by the through-holes 26, 27, and 28. Hence, the detection sensitivity can be enhanced. Moreover, since the respective pluralities of through-holes 26, through-holes 27, and through-holes 28 are disposed, damping can be more reduced and thus the detection sensitivity can be more enhanced.

A width a of the through-hole 26 is greater than a width b of the through-hole 27 and a width c of the through-hole 28. Here, the width of the through-hole is the size of the through-hole in the direction of the second axis Q2 perpendicular to the first axis Q1 serving as the axis of rotation, and in the illustrated example, is the size of the through-hole in the X-axis direction. By making the width a of the through-hole 26 greater than the width b of the through-hole 27 and the width c of the through-hole 28, damping can be efficiently reduced while securing the areas of the movable electrode portions 21 and 22. The reason will be described below.

Figure 3:
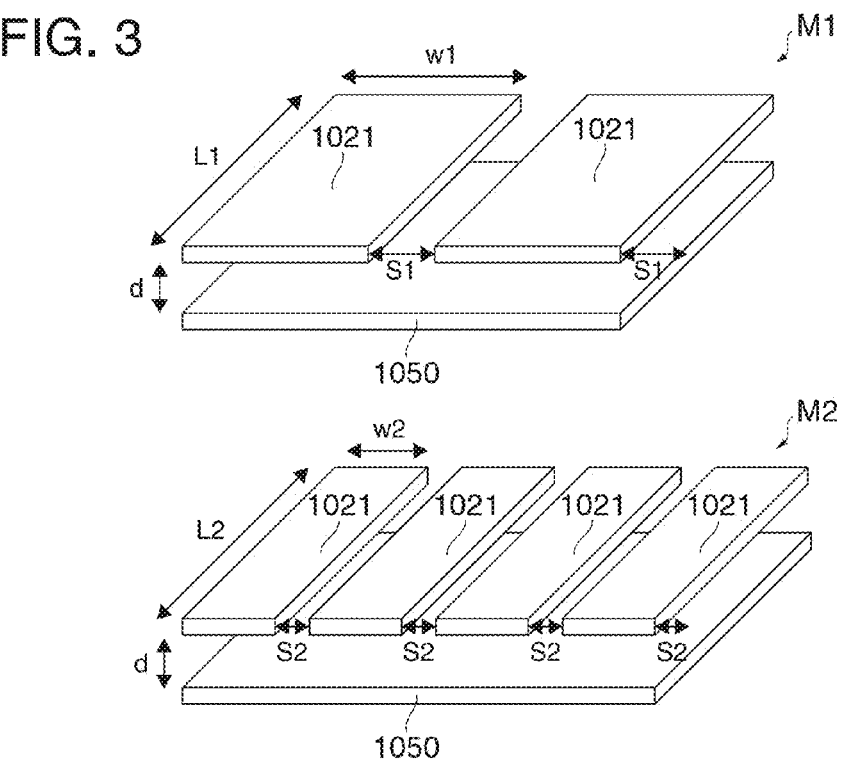
FIG. 3 explains a relation between through-holes and damping.

FIG. 3 explains a relationship between through-holes and damping. In FIG. 3, a model M1 and a model M2 each having movable electrode portions 1021 and a fixed electrode portion 1050 are illustrated. Specifically, a width w1 of the movable electrode portion 1021 of the model M1 is twice a width w2 of the movable electrode portion 1021 of the model M2. Moreover, an interval S1 between the movable electrode portions 1021 next to each other in the model M1 is twice an interval S2 between the movable electrode portions 1021 next to each other in the model M2. Moreover, a length L1 of the movable electrode portion 1021 of the model M1 is the same as a length L2 of the movable electrode portion 1021 of the model M2. Therefore, the total area (2×w1×L1) of the movable electrode portions 1021 of the model M1 is equal to the total area (4×w2×L2) of the movable electrode portions 1021 of the model M2. The total area (2×S1×L1) of the intervals between the movable electrode portions 1021 of the model M1 is equal to the total area (4×S2×L2) of the intervals between the movable electrode portions 1021 of the model M2.

Here, due to the movement of the movable electrode portion 1021, gas between the electrode portions 1021 and 1050 moves. At that time, in regard to the movement of the movable electrode portion 1021, action to stop the movement of the movable electrode portion, that is, damping is caused by the viscosity of the gas. When the width of the movable electrode portion 1021 is w, the length of the movable electrode portion 1021 is L, a distance between the movable electrode portion 1021 and the fixed electrode portion 1050 is d, and the number of pairs of the electrode portions 1021 and 1050 is n, a damping coefficient D representing the magnitude of damping can be expressed by the following equation (1).

$$D = n\eta L \left(\frac{w}{d}\right)^3 \qquad (1)$$

where η is the viscosity coefficient of the air

Based on the equation (1), the damping coefficient D of the model M2 is ¼ of the damping coefficient D of the model M1. This is because the damping coefficient D is proportional to the cube of the width w of the movable electrode portion 1021. In the model M2 as described above, the damping coefficient D can be reduced (damping can be reduced) compared to the model M1, in spite of the fact that the area of the movable electrode portion 1021 is the same as that of the model M1. It is found from the result that by reducing an interval between movable electrode portions next to each other and reducing the width of the movable electrode portion, damping can be efficiently reduced while securing the area of the movable electrode portion.

Hence, in the physical quantity sensor 100, damping can be efficiently reduced by reducing the widths b and c of the through-holes 27 and 28, and securing (or maintaining) the areas of the movable electrode portions 21 and 22. Further, since there is no need to secure (and also enlarge) the area in the damping adjusting portion 23, damping can be reduced more by forming a wider through-hole 26, compared to the through-holes 27 and 28 disposed in the movable electrode portions 21 and 22.

The through-hole 26 disposed in the damping adjusting portion 23 extends in the direction of the first axis Q1 as shown in FIG. 1. The planar shape of the through-hole 26 is, for example, a rectangle having long sides parallel to the first axis Q1 and short sides parallel to the second axis Q2. The plurality of (three) through-holes 26 disposed in the damping adjusting portion 23 are aligned along the second axis Q2 (in the X-axis direction). The plurality of through-holes 26 have the same width a and length (size in the Y-axis direction). That is, the plurality of through-holes 26 have the same shape. The plurality of through-holes 26 may each have a different shape.

The through-hole 27 disposed in the first movable electrode portion 21 extends in the direction of the first axis Q1. In the illustrated example, the planar shape of the through-hole 27 is a rectangle having long sides parallel to the first axis Q1 and short sides parallel to the second axis Q2. Therefore, in the first movable electrode portion 21, the planar shape of a portion between the through-holes 27 next to each other can be made into a rectangle having long sides parallel to the first axis Q1 and short sides parallel to the second axis Q2. Hence, damping can be efficiently reduced while securing the area of the first movable electrode portion 21. The plurality of (five) through-holes 27 disposed in the first movable electrode portion 21 are aligned along the second axis Q2. The plurality of through-holes 27 have the same width b and length. That is, the plurality of through-holes 27 have the same shape. The plurality of through-holes 27 may each have a different shape.

The through-hole 28 disposed in the second movable electrode portion 22 extends in the direction of the first axis Q1. In the illustrated example, the planar shape of the through-hole 28 is a rectangle having long sides parallel to the first axis Q1 and short sides parallel to the second axis Q2. Therefore, in the second movable electrode portion 22, the planar shape of a portion between the through-holes 28 next to each other can be made into a rectangle having long sides parallel to the first axis Q1 and short sides parallel to the second axis Q2. Hence, damping can be efficiently reduced while securing the area of the second movable electrode portion 22. The plurality of (five) through-holes 28 disposed in the second movable electrode portion 22 are aligned along the second axis Q2. The plurality of through-holes 28 have the same width c and length. That is, the plurality of through-holes 28 have the same shape. The plurality of through-holes 28 may each have a different shape.

In the illustrated example, the fixed electrode portions 50 and 52 are located inside the outer circumferential edge of the movable body 20 in plan view. Therefore, the area of a region where the first movable electrode portion 21 overlaps with the first fixed electrode portion 50 is equal to that obtained by subtracting, from the area of the first fixed electrode portion 50, the total area of the through-holes disposed in the first movable electrode portion 21. Moreover, the area of a region where the second movable electrode portion 22 overlaps with the second fixed electrode portion 52 is equal to that obtained by subtracting, from the area of the second fixed electrode portion 52, the total area of the through-holes 28 disposed in the second movable electrode portion 22.

Here, the through-hole 27 and the through-hole 28 have the same shape, and the area of the through-hole 27 (area of an opening) is equal to the area of the through-hole 28 (area of an opening). Moreover, the number of the through-holes 27 is equal to the number of the through-holes 28. That is, the total area of the through-holes 27 disposed in the first movable electrode portion 21 is equal to the total area of the through-holes 28 disposed in the second movable electrode portion 22. Moreover, the area of the first fixed electrode portion 50 is equal to the area of the second fixed electrode portion 52. Hence, in a portion excepting the second through-holes 27 and 28 in plan view, the area of the region where the first movable electrode portion 21 overlaps with the first fixed electrode portion 50 is equal to the area of the region where the second movable electrode portion 22 overlaps with the second fixed electrode portion 52. Therefore, in an initial state (state where the movable body is horizontal), the electrostatic capacitance C1 between the first movable electrode portion 21 and the first fixed electrode portion 50 can be made equal to the electrostatic capacitance C2 between the second movable electrode portion 22 and the second fixed electrode portion 52.

The first fixed electrode portion 50 is disposed at a position of the support substrate 10 at which the support substrate 10 faces the first movable electrode portion 21. The electrostatic capacitance C1 is formed by the first movable electrode portion 21 and the first fixed electrode portion 50. Moreover, the second fixed electrode portion 52 is disposed at a position of the support substrate 10 at which the support substrate 10 faces the second movable electrode portion 22. The electrostatic capacitance C2 is formed by the second movable electrode portion 22 and the second fixed electrode portion 52. The electrostatic capacitance C1 and the electrostatic capacitance C2 are configured such that, for example, in the initial state (state where the movable body 20 is horizontal), they are equal to each other. The positions of the first movable electrode portion 21 and the second movable electrode portion 22 change according to the movement of the movable body 20. According to changes in the position of the movable electrode portions 21 and 22, the electrostatic capacitances C1 and C2 are changed. A predetermined potential is given to the movable body 20 via, for example, the beam portions 30 and 32.

Although not illustrated, the first fixed electrode portion 50 may be disposed at a position of the lid 60 at which the lid 60 faces the first movable electrode portion 21, and the second fixed electrode portion 52 may be disposed at a position of the lid 60 at which the lid 60 faces the second movable electrode portion 22.

The first beam portion 30 and the second beam portion 32 support the movable body 20 displaceably about the first axis Q1. The beam portions 30 and 32 function as torsion springs. With this configuration, the beam portions 30 and 32 have a high resilience against torsion deformation caused in the beam portions 30 and 32 due to the movable body 20 rocking in a seesaw manner, so that the breakage of the beam portions 30 and 32 can be prevented.

The first beam portion 30 and the second beam portion 32 are arranged on the first axis Q1 in plan view as shown in FIG. 1. The beam portions 30 and 32 extend on the first axis Q1 from the fixed portion 40 to the movable body 20. The beam portions 30 and 32 are members to determine the position of the first axis Q1 serving as the axis of rotation (rocking axis) of the movable body 20. The beam portions 30 and 32 connect the fixed portion 40 with the movable body 20. The first beam portion 30 is connected to a side surface of the movable body 20 on the positive Y-axis direction side, while the second beam portion 32 is connected to a side surface of the movable body 20 on the negative Y-axis direction side.

The fixed portion 40 is disposed around the movable body 20 in plan view. In the illustrated example, the fixed portion 40 is disposed so as to surround the movable body 20 in plan view. The shape of the fixed portion 40 is not particularly limited. The fixed portion 40 is fixed to the support substrate 10. The fixed portion 40 and the movable body 20 are spaced apart from each other. The gap 4 is disposed between the fixed portion 40 and the movable body 20.

The movable body 20, the beam portions 30 and 32, and the fixed portion 40 are integrally disposed. The movable body 20, the beam portions 30 and 32, and the fixed portion 40 are integrally disposed by patterning one substrate (for example, a silicon substrate).

The first fixed electrode portion 50 is disposed on the support substrate 10. The first fixed electrode portion 50 is arranged at a position facing the first movable electrode portion 21. Above the first fixed electrode portion 50, the first movable electrode portion 21 is located with the gap 2. The first fixed electrode portion 50 is disposed so as to form the electrostatic capacitance C1 with the first movable electrode portion 21.

The second fixed electrode portion 52 is disposed on the support substrate 10. The second fixed electrode portion 52 is arranged at a position facing the second movable electrode portion 22. Above the second fixed electrode portion 52, the second movable electrode portion 22 is located with the gap. The second fixed electrode portion 52 is disposed so as to form the electrostatic capacitance C2 with the second movable electrode portion 22. The area of the first fixed electrode portion 50 is equal to the area of the second fixed electrode portion 52. The planar shape of the first fixed electrode portion 50 and the planar shape of the second fixed electrode portion 52 are symmetrical to each other with respect to, for example, the first axis Q1.

The material of the fixed electrode portions 50 and 52 is, for example, aluminum, gold, ITO (Indium Tin Oxide), or the like. The material of the fixed electrode portions 50 and 52 desirably a transparent electrode material such as ITO. This is because, with the use of a transparent electrode material as the fixed electrode portions 50 and 52, when the support substrate 10 is a transparent substrate (glass substrate), a foreign substance or the like existing on the fixed electrode portions 50 and 52 can be visually recognized easily.

The lid 60 is placed on the support substrate 10. As the lid 60, a silicon substrate (substrate made of silicon), for example, can be used. When a glass substrate is used as the support substrate 10, the support substrate 10 and the lid 60 may be bonded together by anodic bonding.

Next, the operations of the physical quantity sensor 100 will be described. In the physical quantity sensor 100, the movable body 20 rocks (rotates) about the first axis Q1 according to a physical quantity such as acceleration or angular velocity. With the movement of the movable body 20, a distance between the first movable electrode portion 21 and the first fixed electrode portion 50 and a distance between the second movable electrode portion 22 and the second fixed electrode portion 52 are changed. Specifically, one of the distance between the electrode portions 21 and 50 and the distance between the electrode portions 22 and 52 is increased, while the other distance is reduced. Therefore, due to the rocking (rotation) of the movable body 20, one of the electrostatic capacitances C1 and C2 is increased, while the other is reduced. Hence, based on the difference between the electrostatic capacitance C1 and the electrostatic capacitance C2 (by a so-called differential capacitance detection method), a physical quantity such as acceleration or angular velocity can be detected.

As described above, the physical quantity sensor 100 can be used as an inertial sensor such as an acceleration sensor or a gyro sensor. Specifically, the physical quantity sensor 100 can be used as, for example, an electrostatic capacitive acceleration sensor for measuring acceleration in the vertical direction.

The physical quantity sensor 100 according to the embodiment has, for example, the following features.

In the physical quantity sensor 100, the movable body 20 has, with the first axis Q1 serving as the axis of rotation as the boundary, the first movable electrode portion 21 and the damping adjusting portion 23 disposed in the first seesaw piece 20a and the second movable electrode portion 22 disposed in the second seesaw piece 20b. In the portion excepting the second through-holes 27 and 28 in plan view, the area of the region where the first movable electrode portion 21 overlaps with the first fixed electrode portion 50 is equal to the area of the region where the second movable electrode portion 22 overlaps with the second fixed electrode portion 52. With this configuration, in the initial state (state where the movable body is horizontal), the electrostatic capacitance C1 between the first movable electrode portion 21 and the first fixed electrode portion 50 can be made equal to the electrostatic capacitance C2 between the second movable electrode portion 22 and the second fixed electrode portion 52. Hence, for example, for eliminating a difference between an initial capacitance between the electrode portions 21 and 50 and an initial capacitance between the electrode portions 22 and 52, an adjustment of the gap between the movable electrode portion and the fixed electrode portion, or a circuit or the like for correcting the difference between the initial capacitances is not required, so that an apparatus can be made to have a simple configuration. According to the physical quantity sensor 100 as described above, the electrostatic capacitances C1 and C2 in the initial state can be made equal to each other with a simple configuration.

Further, in the physical quantity sensor 100, the width a of the through-hole 26 disposed in the damping adjusting portion 23 is greater than the widths b and c of the through-holes 27 and 28 disposed in the movable electrode portions 21 and 22. With this configuration, damping can be efficiently reduced while securing the areas of the movable electrode portions 21 and 22. Moreover, there is no need to secure (increase) the area in the damping adjusting portion 23, damping can be more reduced by forming the through-hole 26 with a greater width compared to the through-holes 27 and 28 disposed in the movable electrode portions 21 and 22. Hence, according to the physical quantity sensor 100, the detection sensitivity can be enhanced. According to the physical quantity sensor 100 as described above, a simple configuration is provided, and the detection sensitivity can be enhanced.

In the physical quantity sensor 100, the mass of the first seesaw piece 20a of the movable body 20 is different from the mass of the second seesaw piece 20b of the movable body 20. Therefore, when acceleration in the vertical direction is applied for example, the rotation moment of one side (the first seesaw piece 20a) of the movable body 20 and the rotation moment of the other side (the second seesaw piece 20b) of the movable body 20 are not balanced, so that a predetermined inclination can be produced in the movable body.

In the physical quantity sensor 100, the area of the through-hole 27 disposed in the first movable electrode portion 21 is equal to the area of the through-hole 28 disposed in the second movable electrode portion 22. With this configuration, the electrostatic capacitances C1 and C2 in the initial state can be made equal to each other with a simple configuration.

Moreover, in the physical quantity sensor 100, the total area of the through-holes 27 disposed in the first movable electrode portion 21 is equal to the total area of the through-holes 28 disposed in the second movable electrode portion 22. With this configuration, the electrostatic capacitances C1 and C2 in the initial state can be made equal to each other with a simple configuration.

In the physical quantity sensor 100, the through-holes 27 and 28 disposed in the movable electrode portions 21 and 22 extend in the direction of the first axis Q1 in plan view. With this configuration, damping can be efficiently reduced while securing the areas of the movable electrode portions 21 and 22.

In the physical quantity sensor 100, the plurality of through-holes 26 are disposed in the damping adjusting portion 23. Moreover, the plurality of through-holes 27 are disposed in the first movable electrode portion 21, and the plurality of through-holes 28 are disposed in the second movable electrode portion 22. With this configuration, damping can be more reduced.

In the physical quantity sensor 100, the damping adjusting portion 23 is disposed at the edge portion of the movable body 20 in the direction of the second axis Q2. With this configuration, since the through-holes 26 can be disposed at points away from the first axis Q1 serving as the axis of rotation, damping can be efficiently reduced.

2. Method for Manufacturing Physical Quantity Sensor

Figure 4:
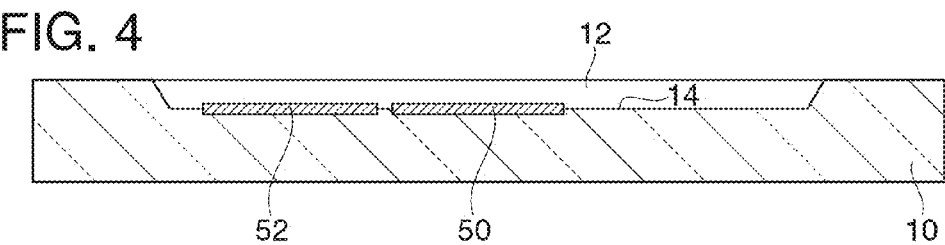
FIG. 4 is a cross-sectional view schematically showing a manufacturing process of the physical quantity sensor according to the embodiment.
Figure 5:
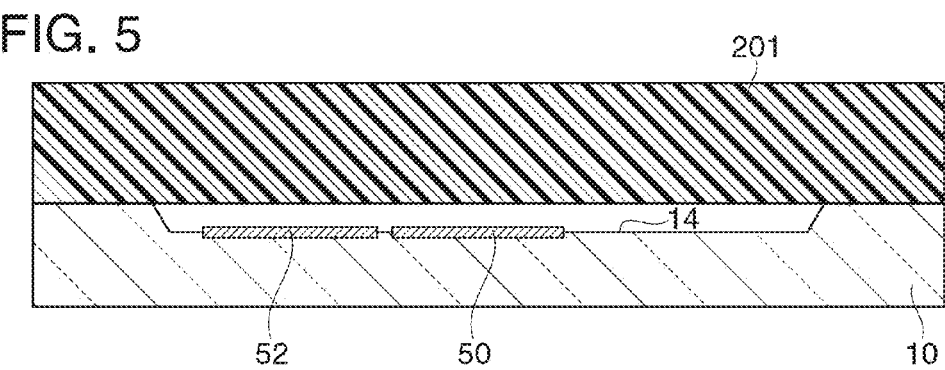
FIG. 5 is a cross-sectional view schematically showing a manufacturing process of the physical quantity sensor according to the embodiment.
Figure 6:
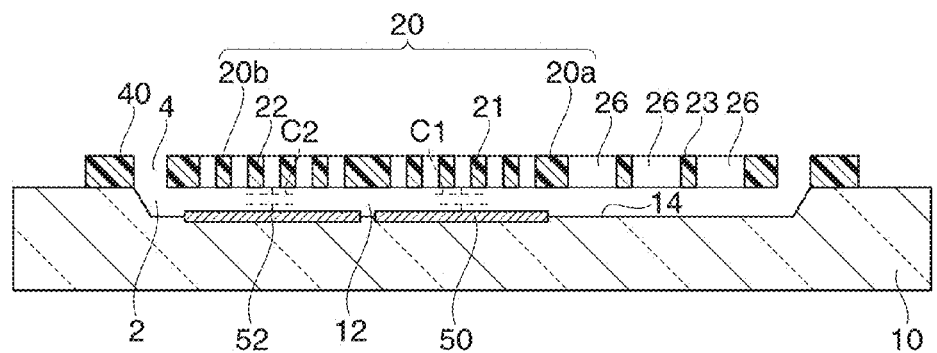
FIG. 6 is a cross-sectional view schematically showing a manufacturing process of the physical quantity sensor according to the embodiment.

Next, a method for manufacturing the physical quantity sensor according to the embodiment will be described with reference to the drawings. FIGS. 4 to 6 are cross-sectional views schematically showing manufacturing processes of the physical quantity sensor 100 according to the embodiment.

As shown in FIG. 4, a glass substrate is etched and the recess 12 is formed in the glass substrate for example, whereby the support substrate 10 is obtained. The etching is performed by, for example, wet etching.

Next, the first fixed electrode portion 50 and the second fixed electrode portion 52 are formed on the surface 14 of the support substrate 10, where the surface 14 defines the bottom surface of the recess 12. The fixed electrode portions 50 and 52 are formed by depositing a conductive layer on the surface 14 of the support substrate 10 by a sputtering method or the like and then patterning the conductive layer using a photolithographic technique and an etching technique.

As shown in FIG. 5, a silicon substrate 201 (sensor substrate) is bonded to the support substrate 10. The bonding of the support substrate 10 with the silicon substrate 201 is performed by, for example, anodic bonding or direct bonding, or using adhesive.

As shown in FIG. 6, after thinning the silicon substrate 201 by, for example, grinding using a grinding machine, the silicon substrate 201 is patterned into a desired shape to form the movable body 20, the beam portions 30 and 32, and the fixed portion 40. Further, the through-holes 26, 27, and 28 are formed in the movable body 20. The patterning is performed by a photolithographic technique and an etching technique (dry etching), and as a more specific etching technique, the Bosch process can be used. In this process, the movable body 20, the beam portions 30 and 32, and the fixed portion 40 are integrally formed by patterning (etching) the silicon substrate 201.

As shown in FIGS. 1 and 2, the lid 60 is bonded to the support substrate 10 to accommodate the movable body 20 in a space formed by the support substrate 10 and the lid 60. The bonding of the support substrate 10 with the lid 60 is performed by, for example, anodic bonding, or using adhesive or the like. This process is performed in an inert gas atmosphere, whereby an inert gas can be filled in the space in which the movable body 20 is accommodated.

Through the processes described above, the physical quantity sensor 100 can be manufactured.

3. Modified Example of Physical Quantity Sensor

Figure 7:
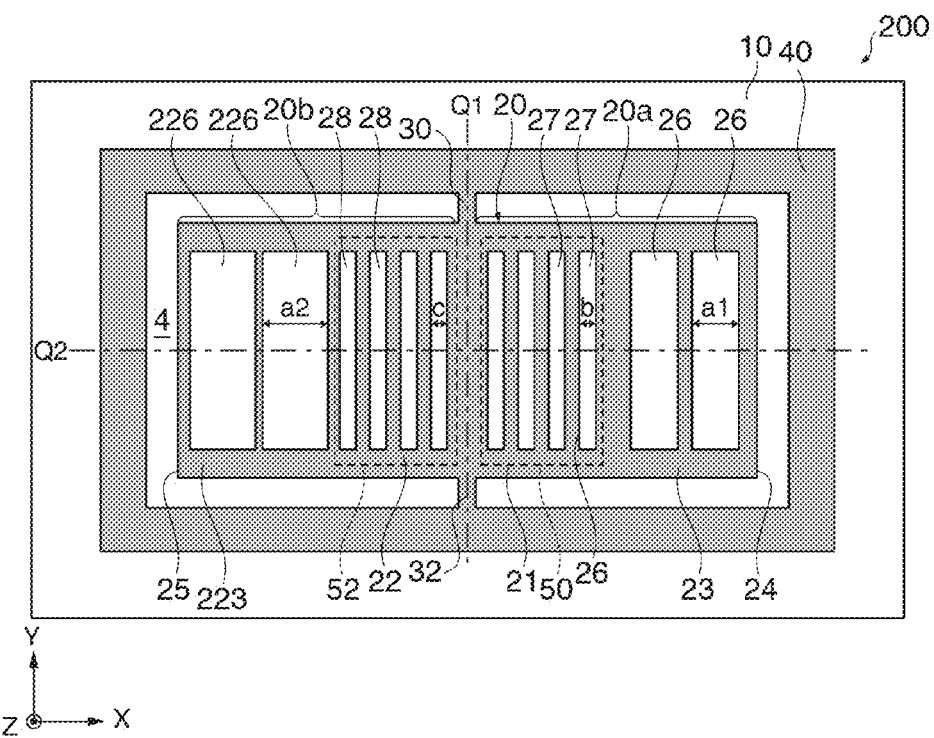
FIG. 7 is a plan view schematically showing a modified example of a physical quantity sensor according to the embodiment.

Next, a physical quantity sensor according to a modified example of the embodiment will be described with reference to the drawing. FIG. 7 is a plan view schematically showing the physical quantity sensor 200 according to the modified example of the embodiment. Hereinafter, in the physical quantity sensor 200, members having functions similar to those of the constituent members of the physical quantity sensor 100 described above are denoted by the same reference numerals and signs, and the detailed descriptions thereof are omitted.

In the physical quantity sensor 100 described above as shown in FIG. 1, the first axis Q1 serving as the axis of rotation is arranged at a position shifted from the center (center of gravity) of the movable body 20.

In contrast to this, in the physical quantity sensor 200 as shown in FIG. 7, the first axis Q1 serving as the axis of rotation is arranged so as to pass through the center (center of gravity) of the movable body 20.

The movable body 20 has the first movable electrode portion 21 and the damping adjusting portion 23 (first damping adjusting portion 23) on one side (the first seesaw piece 20a) of the first axis Q1 and the second movable electrode portion 22 and a second damping adjusting portion 223 on the other side (the second seesaw piece 20b) of the first axis Q1.

The second damping adjusting portion 223 is a portion of the second seesaw piece 20b, where the portion does not overlap with the second fixed electrode portion 52 in plan view. In the illustrated example, the second damping adjusting portion 223 is disposed at an edge portion of the movable body 20 in the direction of the second axis Q2 (direction along the second axis Q2). In the second damping adjusting portion 223, through-holes 226 penetrating through the movable body 20 in its thickness direction are disposed. In the illustrated example, the plurality of (two) through-holes 226 are disposed in the second damping adjusting portion 223. By adjusting the numbers or areas of the through-holes 26 and 226 in the damping adjusting portions 23 and 223, the damping of the movable body 20 can be adjusted.

A width a2 of the through-hole 226 disposed in the second damping adjusting portion 223 is greater than a width a1 of the through-hole 26 disposed in the first damping adjusting portion 23. Therefore, the mass of the first seesaw piece 20a is greater than the mass of the second seesaw piece 20b. Hence, when acceleration in the vertical direction is applied for example, the rotation moment of one side (the first seesaw piece 20a) of the movable body 20 and the rotation moment of the other side (the second seesaw piece 20b) of the movable body 20 are not balanced, so that a predetermined inclination can be produced in the movable body.

According to the physical quantity sensor 200, the widths a1 and a2 of the through-holes 26 and 226 disposed in the damping adjusting portions 23 and 223 are greater than the widths b and c of the through-holes 27 and 28 disposed in the movable electrode portions 21 and 22. With this configuration, similarly to the physical quantity sensor 100, damping can be efficiently reduced while securing the areas of the movable electrode portions 21 and 22. Moreover, there is no need to increase the areas in the damping adjusting portions 23 and 223. Therefore, damping can be more reduced by forming the through-holes 26 and 226 with a greater width compared to the through-holes 27 and 28 disposed in the movable electrode portions 21 and 22. Hence, according to the physical quantity sensor 200, the detection sensitivity can be enhanced. Further, since the area of the region where the first movable electrode portion 21 overlaps with the first fixed electrode portion 50 is equal to the area of the region where the second movable electrode portion 22 overlaps with the second fixed electrode portion 52, the electrostatic capacitances C1 and C2 in the initial state can be made equal to each other with a simple configuration.

4. Electronic Apparatuses

Next, electronic apparatuses according to the embodiment will be described with reference to the drawings. The electronic apparatuses according to the embodiment include any of the physical quantity sensors according to the embodiment of the invention. In the following, electronic apparatuses including the physical quantity sensor 100 as the physical quantity sensor according to the embodiment of the invention will be described.

Figure 8:
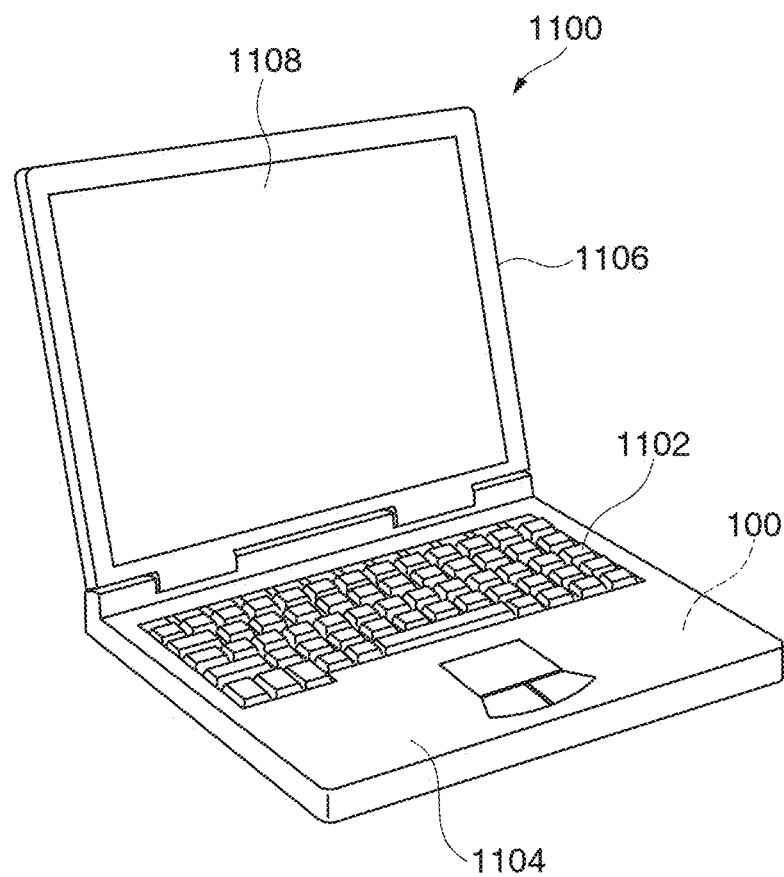
FIG. 8 is a perspective view schematically showing an electronic apparatus according to the embodiment.

FIG. 8 is a perspective view schematically showing a mobile (or notebook) personal computer 1100 as an electronic apparatus according to the embodiment.

As shown in FIG. 8, the personal computer 1100 includes a main body portion 1104 including a keyboard 1102 and a display unit 1106 having a display portion 1108. The display unit 1106 is rotationally movably supported relative to the main body portion 1104 via a hinge structure portion.

In the personal computer 1100, the physical quantity sensor 100 is incorporated.

Figure 9:
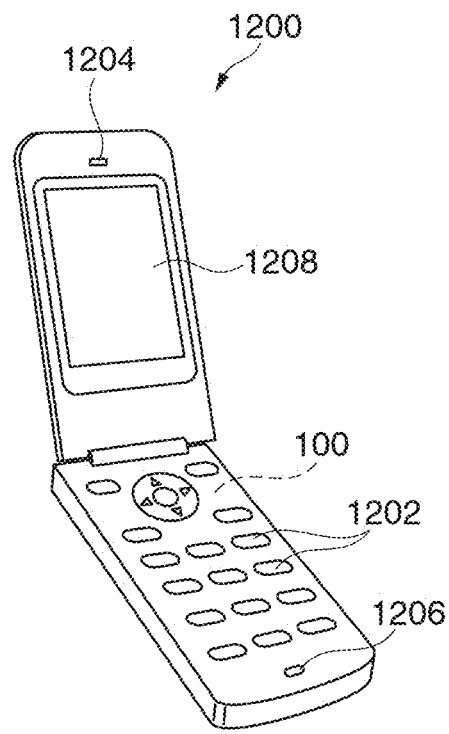
FIG. 9 is a perspective view schematically showing an electronic apparatus according to the embodiment.

FIG. 9 is a perspective view schematically showing a mobile phone (including a PHS) 1200 as an electronic apparatus according to the embodiment.

As shown in FIG. 9, the mobile phone 1200 includes a plurality of operation buttons 1202, an earpiece 1204, and a mouthpiece 1206. A display portion 1208 is arranged between the operation buttons 1202 and the earpiece 1204.

In the mobile phone 1200, the physical quantity sensor 100 is incorporated.

Figure 10:
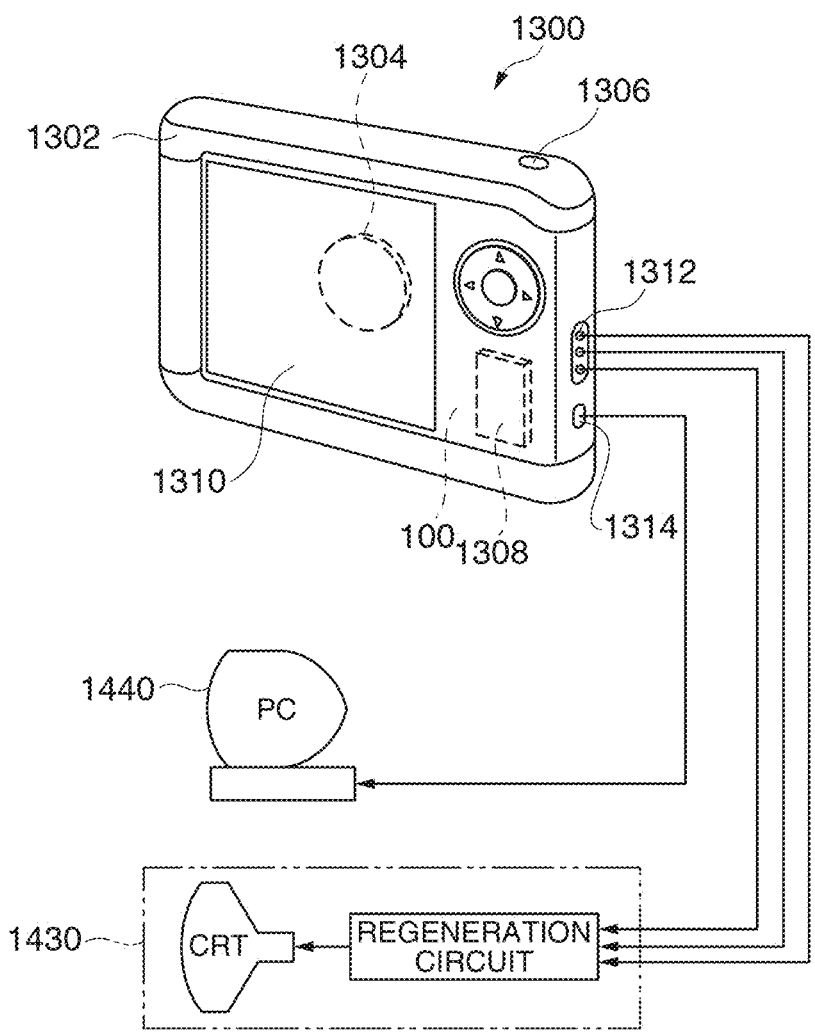
FIG. 10 is a perspective view schematically showing an electronic apparatus according to the embodiment.

FIG. 10 is a perspective view schematically showing a digital still camera 1300 as an electronic apparatus according to the embodiment. In FIG. 10, connections with external apparatuses are also shown in a simplified manner.

Here, usual cameras expose a silver halide photographic film with an optical image of a subject, whereas the digital still camera 1300 photoelectrically converts an optical image of a subject with an imaging element such as a CCD (Charge Coupled Device) to generate imaging signals (image signals).

A display portion 1310 is disposed on the back surface of a case (body) 1302 in the digital still camera 1300 and configured to perform display based on imaging signals generated by a CCD. The display portion 1310 functions as a finder that displays a subject as an electronic image.

Moreover, on the front side (the rear side in the drawing) of the case 1302, a light receiving unit 1304 including an optical lens (imaging optical system) and a CCD is disposed.

When a photographer confirms a subject image displayed on the display portion 1310 and presses down a shutter button 1306, imaging signals of a CCD at the time are transferred to and stored in a memory 1308.

Moreover, in the digital still camera 1300, a video signal output terminal 1312 and a data communication input/output terminal 1314 are disposed on the side surface of the case 1302. Then, a television monitor 1430 and a personal computer 1440 are connected as necessary to the video signal output terminal 1312 and the data communication input/output terminal 1314, respectively. Further, the imaging signals stored in the memory 1308 are output to the television monitor 1430 or the personal computer 1440 by a predetermined operation.

In the digital still camera 1300, the physical quantity sensor 100 is incorporated.

The electronic apparatuses 1100, 1200, and 1300 described above include the physical quantity sensor 100 that has a simple configuration and can enhance the detection sensitivity. Therefore, the electronic apparatuses 1100, 1200, and 1300 have a simple configuration and can enhance the detection sensitivity.

An electronic apparatus including the physical quantity sensor 100 can be applied to for example, in addition to the personal computer (mobile personal computer) shown in FIG. 8, the mobile phone shown in FIG. 9, and the digital still camera shown in FIG. 10, inkjet ejection apparatuses (for example, inkjet printers), laptop personal computers, television sets, video camcorders, video tape recorders, various kinds of navigation systems, pagers, electronic notebooks (including those with communication function), electronic dictionaries, calculators, electronic gaming machines, word processors, workstations, videophones, surveillance television monitors, electronic binoculars, POS terminals, medical equipment (for example, electronic thermometers, sphygmomanometers, blood glucose meters, electrocardiogram measuring systems, ultrasonic diagnosis apparatuses, and electronic endoscopes), fishfinders, various kinds of measuring instrument, indicators (for example, indicators used in vehicles, aircraft, and ships), flight simulators, and the like.

The invention includes a configuration (for example, a configuration having the same function, method, and result, or a configuration having the same advantage and effect) that is substantially the same as those described in the embodiment. Moreover, the invention includes a configuration in which a non-essential portion of the configurations described in the embodiment is replaced. Moreover, the invention includes a configuration providing the same operational effects as those described in the embodiment, or a configuration capable of achieving the same advantages. Moreover, the invention includes a configuration in which a publicly known technique is added to the configurations described in the embodiment.

The entire disclosure of Japanese Patent Application No. 2012-087244, filed Apr. 6, 2012 is expressly incorporated by reference herein.

What is claimed is:

1. A physical quantity sensor comprising:
    a movable body displaceable about a first axis as an axis of rotation and including, with the first axis as a boundary in plan view, a first movable electrode portion disposed in a first region, a second movable electrode portion disposed in a second region, and a damping adjusting portion disposed in the first region or the second region and at an edge portion of the movable body in a direction of a second axis crossing the first axis;
    a beam portion supporting the movable body;
    a first fixed electrode portion arranged to face the first movable electrode portion; and
    a second fixed electrode portion arranged to face the second movable electrode portion, wherein
    a first through-hole is disposed in the damping adjusting portion,
    each of a plurality of second through-holes is disposed in the first movable electrode portion and the second movable electrode portion,
    in a portion excepting the second through-holes in plan view, the area of a region where the first movable electrode portion overlaps with the first fixed electrode portion is the same as the area of a region where the second movable electrode portion overlaps with the second fixed electrode portion,
    the first through-hole has a length in a direction of the first axis and a width in a direction of the second axis, the length of the first through-hole being greater than the width of the first through-hole, and each of the plurality of second through-holes has a length in the direction of the first axis and a width in the direction of the second axis, the length of each second through-hole being greater than the width of each second through-hole,
    the width of the first through-hole is greater than the width of each of the plurality of second through-holes,
    the damping adjusting portion is disposed in both of the first region and the second region, and
    the width of the first through-hole of the damping adjusting portion disposed in the first region is greater than the width of the first through-hole of the damping adjusting portion disposed in the second region.

2. The physical quantity sensor according to claim 1, wherein
    the mass of the first region of the movable body and the mass of the second region of the movable body are different from each other.

3. The physical quantity sensor according to claim 1, wherein
    the total area of an opening surface of the second through-hole disposed in the first movable electrode portion, the opening surface being on the first fixed electrode portion side, is the same as the total area of an opening surface of each of the second through-holes disposed in the second movable electrode portion, the opening surface being on the second fixed electrode portion side.

4. An electronic apparatus comprising the physical quantity sensor according to claim 1,
wherein the electronic apparatus is one of a personal computer, a mobile phone, or a digital still camera.

* * * * *